United States Patent
Kamps et al.

(10) Patent No.: US 9,260,062 B2
(45) Date of Patent: Feb. 16, 2016

(54) MODULAR IMAGE DETECTION UNIT

(75) Inventors: Rolf Kamps, Wuppertal (DE); Ulrich Müller, Velbert (DE)

(73) Assignee: HUF HULSBECK & FURST GMBH & CO KG (DE)

( * ) Notice: Subject to any disclaimer, the term of this patent is extended or adjusted under 35 U.S.C. 154(b) by 669 days.

(21) Appl. No.: 13/063,168

(22) PCT Filed: Sep. 9, 2009

(86) PCT No.: PCT/EP2009/061697
§ 371 (c)(1),
(2), (4) Date: May 5, 2011

(87) PCT Pub. No.: WO2010/029109
PCT Pub. Date: Mar. 18, 2010

(65) Prior Publication Data
US 2011/0211062 A1    Sep. 1, 2011

(30) Foreign Application Priority Data
Sep. 9, 2008   (DE) .................. 10 2008 046 453

(51) Int. Cl.
*H04N 7/00* (2011.01)
*H04N 7/18* (2006.01)
*B60R 11/04* (2006.01)
*B60R 11/00* (2006.01)

(52) U.S. Cl.
CPC ......... *B60R 11/04* (2013.01); *B60R 2011/0094* (2013.01)

(58) Field of Classification Search
USPC ..................... 348/118, E7.085, 143
See application file for complete search history.

(56) References Cited

U.S. PATENT DOCUMENTS 5,619,036 A       4/1997  Salvio et al.
6,819,231 B2 *  11/2004  Berberich et al. ............ 340/435
7,454,128 B2 *  11/2008  Lang et al. ................... 396/5
(Continued)

FOREIGN PATENT DOCUMENTS

DE         20219004 U1    3/2003
DE         202004014825   11/2004
(Continued)

OTHER PUBLICATIONS

Machine translation of DE102004050297A1.*
(Continued)

*Primary Examiner* — Christopher S Kelley
*Assistant Examiner* — Ana Picon-Feliciano
(74) *Attorney, Agent, or Firm* — Cantor Colburn LLP (57) ABSTRACT

An image detection system having a camera unit for detecting images of the outside area of a motor vehicle, and a protection element that can be moved from a closed position to an open position by a mechanism through a drive. At least one lens of the camera unit is located behind the protection element inaccessible from the outside when the protection element is located in the closed position. At least the lens is released by the protection element for image detection in the open position. At least the camera unit with the mechanism and the protection element is disposed in a first module and the drive is provided in a second module separate from the first module. The first and second modules are mechanically connected to one another by at least one actuation element so that the drive drives the mechanism by way of the actuation element.

17 Claims, 4 Drawing Sheets

(56) References Cited

U.S. PATENT DOCUMENTS

| | | | |
|---|---|---|---|
| 7,619,508 B2 * | 11/2009 | Lynam et al. | 340/438 |
| 2002/0063778 A1 * | 5/2002 | Kormos | 348/148 |
| 2003/0146831 A1 | 8/2003 | Berberich et al. | |
| 2005/0206727 A1 * | 9/2005 | Kormos | 348/148 |
| 2005/0243171 A1 * | 11/2005 | Ross et al. | 348/148 |
| 2006/0139482 A1 * | 6/2006 | Miguel Sanz et al. | 348/373 |
| 2007/0088488 A1 * | 4/2007 | Reeves et al. | 701/117 |
| 2008/0055409 A1 * | 3/2008 | Mars et al. | 348/143 |
| 2008/0165251 A1 * | 7/2008 | O'Kere | 348/148 |
| 2008/0266447 A1 * | 10/2008 | Ohara et al. | 348/374 |
| 2009/0100886 A1 * | 4/2009 | Orzech et al. | 70/265 |
| 2009/0231430 A1 | 9/2009 | Buschmann et al. | |
| 2009/0309971 A1 | 12/2009 | Schuetz | |

FOREIGN PATENT DOCUMENTS

| | | |
|---|---|---|
| DE | 102004039450 | 3/2006 |
| DE | 102004050297 A1 * | 4/2006 |
| DE | 102005021672 | 11/2006 |
| DE | 102006048371 A1 | 4/2008 |
| EP | 1648737 | 4/2006 |
| JP | 56099835 | 8/1981 |
| JP | 08150875 | 6/1996 |
| JP | 2008016407 | 1/2008 |

OTHER PUBLICATIONS

International Search Report; PCT/EP2009/061697; Dec. 4, 2009.

* cited by examiner

MODULAR IMAGE DETECTION UNIT

TECHNICAL FIELD

The present invention concerns an image acquisition system with a camera unit used for image acquisition of the outside area of the vehicle. Such image acquisition systems have a protective element that can be moved via a mechanism, especially a pivot mechanism by means of a drive from a closed position to an open position, in which case at least one lens of the camera unit is situated inaccessible from the outside behind the protective element in the closed position of the protective element and in the open position at least the lens of the camera unit is released from the protective element for image acquisition.

BACKGROUND

Such image acquisition systems, which are used for image acquisition of an outside area of the vehicle are generally known.

For example, such image acquisition systems can be used in the field of assisted parking of vehicles. The camera units produce an image of the outside area for the driver of the vehicle, especially a rear view of the vehicle, which is displayed on a monitor within the vehicle and represents a significant support for the driver during maneuvering. It is known to mount such systems with a camera unit on various vehicle locations, like a bumper, trunk lid or the like.

A camera system for a vehicle is known from document EP 1 648 737 B1 in which the camera unit can be closed by a protective element in order to protect it from external environmental effects when not in use. If the camera unit is used the protective element is pivoted away so that the camera unit can now record the desired images. For this purpose the entire image acquisition system is equipped with an electric motor that acts directly on the protective element via a gear mechanism to transfer the protective element from an open to a closed position and vice versa. The entire unit of the image acquisition system requires considerable space, for which reason this system cannot be arranged on space-critical locations on or in the vehicle.

BRIEF SUMMARY

It is therefore the task of the present invention to develop an image acquisition system of the aforementioned type, which can also be arranged on space-critical locations and consequently has minor space requirements. The lens of the camera unit should nevertheless be protectable by a protective element.

The image acquisition system according to the invention has at least two modules, at least the camera unit with the mechanism and the protective element being arranged in a first module. The drive is provided in the second module constructionaly separate from the first module, the first and second module being mechanically connected to each other by at least one activation element so that the drive drives the mechanism for the protective element via the activation element. By constructional separation of the image acquisition system into two modules only the first module can therefore be arranged on a space-critical location, which is configured much smaller relative to the second module. The first module then serves for image acquisition with the camera unit, whereas the second module assumes mechanical control of the first module via the activation element. This second module which because of the drive, which generally comprises an electric motor, is configured much larger, can be switched to a location at which sufficient space is available. At least mechanical control of protective elements is then possible via the mentioned activation element. The protective element itself is activated via the mentioned mechanism, which, for example, can be equipped as a pivot or rotational mechanism.

In a first variant the camera unit is unmovable, i.e., arranged rigidly in the first module. Consequently, only the activation element can control or produce activation of the protective element from the open position to the closed position and vice-versa. It is then also conceivable that a second activation element, for example, an activation element of the same construction, is used so that the first activation element is prescribed only for the opening process from the closed position to the open position and the second activation element is prescribed for the closing process from the open position to the closed position.

The required drive of the activation elements can then be produced by a drive or several drives. Ordinarily an electric motor serves as a drive, which can be set up as a servomotor. A gear mechanism can also be arranged between the drive and activation element.

In another practical example it is conceivable that the camera unit is mounted movable in the first module, in which case the activation element also serves for a position change of the camera unit (and not just the protective element) from a rest position into a recording position. In this second practical example it is conceivable that the recording direction of the camera unit is also variable or controllable. For this purpose, it can be prescribed that the camera unit be mounted movable in the first module, in which case the first activation element activates the protective element and the second activation element serves for a position change of the camera unit from a rest position to a recording position. The recording direction of the camera unit can also be controlled with the second activation element. It is then also conceivable that a third activation element is provided in order to execute the recording direction not only in one dimension, but also in a second dimension. In other words, the camera, for example, can be pivoted not only up and down, but also to the left and right by the corresponding activation element. It is also conceivable that the camera unit is mounted to rotate on a circular track around the central recording axis with only one activation element in order to therefore obtain the greatest possible recording range.

It can also be prescribed that only one activation element is provided between the first and second module, in which case the activation element transfers the protective element from its closed position to its open position and a recording direction of the moving camera is controllable by the same activation element. For this purpose the movement of the activation element produced by the drive can initially be used to open the protective element in order to then use further movement of the activation element to control the recording direction of the moving camera unit. It is also conceivable that the activation element simultaneously activates the protective element and the camera unit so that not only the protective element but also the camera unit is controlled by the activation element.

It is also conceivable that the mechanism for the protective element also serves to accommodate and house the moving camera unit. The protective element can therefore be moved simultaneously with the camera unit. The camera unit however, can also be mounted via an additional mechanism in the first module so that separate movement of the protective element is possible by the moving camera unit. It is also conceivable that the different mechanisms for the protective element and the moving camera unit are coupled to each other in order to produce deliberate movement processes.

It can also optionally be prescribed that the protective element and/or the moving camera unit are spring-loaded so that the protective element can be transferred by spring force from its open position to its closed position or the camera unit can be transferred from the recording position to the rest position. The mentioned spring force can be furnished by one or more spring elements, in which case the activation element works at least partially against the spring element in order to control the protective element or the moving camera unit. However, it is possible that an automatic return of the protective element from its open position to the closed position is possible without having to drive the activation element for this purpose. Instead the spring force supplies the required restoring force of the protective element. Naturally the same spring force or a spring force from an additional spring element can also be used to automatically reset the moving camera unit. This reset expediently occurs from the recording position to the rest position. However, a reverse resetting is naturally also conceivable. If only one activation element is provided in order to activate the protective element in the camera unit, one spring element is also sufficient to automatically carry out reset.

It is also conceivable that the mechanism for activation of the protective element has a toggle lever mechanism so that the protective element cannot be activated from the outside in the closed position, so that it is blocked in the closed position. It is therefore only possible to remove the protective element violently from the closed position. Through the mentioned toggle lever mechanism no lock or the like is necessary in order to secure the protective element in the closed position. Instead the toggle lever mechanism has a self-inhibiting effect. The camera unit can be secured in the rest position by an additional or the same toggle lever mechanism.

The image acquisition system according to the invention can have an activation element which is equipped as a Bowden cable, a pushrod and/or rotating rod, gear mechanism, toothed belt or chain or the like. It is advantageous here, if the activation element is configured flexible in order to achieve any arrangement of the two modules relative to each other. Consequently, the same modules and activation elements can be used for different vehicle models in which only the arrangement of the flexible activation element need be adjusted to the corresponding installation situation. It is then recommended to connect the activation element to the vehicle via clip connections. To avoid flapping noises during driving, the activation element itself can be mounted in foam cushions or foam rollers. These foam cushions also prevent fraying of the activation element at possible contact sites on the vehicle.

It is also conceivable that the protective element is configured in one part as a cover flap, in which case the cover flap can be shaped arc-like or flat. A multipart protective element can optionally also be provided, which has louver or central closure. It is also conceivable that a multipart shutter closure is used so that the protective element can also be guided arc-like over the lens of the camera unit. For this purpose the protective element can be mounted in a slit-like guide in front of the lens of a camera unit. The slit-like guide can be designed linear, arc-like or otherwise. Precisely in a shutter closure an optimal arrangement of the protective element against the lens of a camera unit is therefore attainable so that the protective element is arranged close to but without contact in front of the lens of the camera unit. In addition, a cleaning element in the form of a cleaning lip, a micro-nonwoven or the like can be provided on the inside of the protective element so that the protective element cleans the lens of a camera unit during opening or closing. For this purpose a tube can also be guided to the first module, which furnishes a cleaning fluid in order to avoid scratching of the lens during the cleaning process.

The protective element can also be transferred from its open position to its closed position and vice-versa by means of a translatory and/or rotatory movement, in which the movement process can especially be divided into different phases that differ in their type of movement. For example, a two-phase movement process can occur in which the protective element is removed from the lens of the camera unit in a first movement phase and the protective element pivoted away or rotated out in a second movement phase. A combination of different movement types is also conceivable for the protective element. In a multipart protective element the individual parts of a protective element can also be guided from the top or bottom or laterally over the lens.

According to the invention a significant distance can be provided between the first and second modules, the distance being greater than 5 cm, preferably greater than 10 cm, especially greater than 20 cm. The first module itself can be positioned on this account at very space-critical locations on the vehicle, whereas the second module is arranged far removed at a location in the vehicle that offers sufficient space. Only an electrical line and the activation element lead away from the first module. Generally there is sufficient space for this so that through the invention the image acquisition system can still be arranged at previously inaccessible locations in the vehicle. Arrangement of the image acquisition system in the area of the rear license plate is particularly expedient in order to provide the driver with image information when backing up.

It can additionally be prescribed that an operating element and/or a mechanical lock cylinder is arranged next to the camera unit, which is also accommodated with the protective element in the closed position protected from the outside, in which case the operating element, in particular, can be an electrical switching element, like a button, switch, piezo element or the like. For example, the operating element for central locking in the vehicle can be protected on the trunk lid by the protective element from external soiling so that the operator, even in a dirty vehicle, keeps his hands clean during activation of the trunk lid switch, which comprises the operating element. It can additionally be prescribed that a proximity sensor or additional sensor be provided on the first module. The proximity sensor can serve to detect the approach of a person or object. And it is possible that the protective element is only transferred to the open position if a person attempts to activate the operating element for the central locking via the protective flap. Otherwise the protective element is only transferred from the closed position to the open position automatically when the camera unit is used for image acquisition. It is also conceivable that the central locking also executes control of the protective element via the second module of the image acquisition system. For example, the protective element can then be brought into the open position when the driver of the vehicle has been identified in contactless fashion by an ID transmitter. After a certain time interval central locking can then ensure that the protective flap then moves back to the closed position, if the operating element was not used next to the camera unit.

BRIEF DESCRIPTION OF THE DRAWINGS

Additional advantages, features and details of the invention are apparent from the following description in which several practical examples of the invention are described in detail with reference to the drawings. The features mentioned in the claims and in the description can be significant to the invention both individually or in any combination. In the drawings:

DETAILED DESCRIPTION

Figures 1A, 1B, 1C:
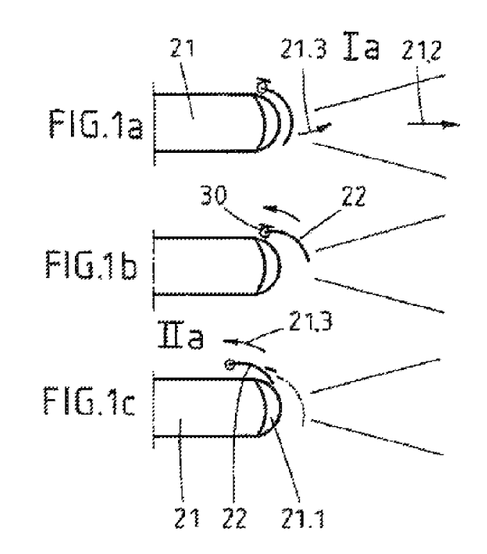
FIG. 1a shows a purely schematic view of the first module of the image acquisition system with a camera unit and a protective element in the closed position Ia.
FIG. 1b shows the image acquisition system according to FIG. 1a, in which the protective element is released from the camera unit.
FIG. 1c shows the image acquisition system according to FIG. 1a, in which the protective element is situated in the open position IIa.

A camera unit 21 with a protective element 22 is shown in FIGS. 1a to 1c. The camera unit 21 serves for image acquisition of the outside area of the vehicle, the protective element 22 being movable from a closed position Ia, which is shown in FIG. 1a, to an open position IIa according to FIG. 1c. In the closed position Ia the camera unit 21 is situated behind the protective element 22 inaccessible from the outside. The camera unit 21 is fastened to the vehicle body within the first module 20 or on the first module 20 (not shown), the camera unit 21 being aligned in a recording direction 21.2. In the open position IIa of the protective element 22 image acquisition of the camera unit 21 can be performed. During movement from the closed position Ia into the open position IIa (called the opening process for short) the protective element 22 executes a two-phase movement. A first movement phase is characterized by a pivot movement of the protective element 22 and the first axis 30. In this first movement phase the protective element 22 is separated from the camera unit 21 and moved essentially in recording direction 21.2. Through this first movement phase a greater distance is initially created between the protective element 22 and the camera unit 21. In a subsequent second movement phase a protective element 22 together with the first axis 30 is moved away from the front area of the camera unit 21, especially lens 21.1. The camera unit 21 can be fastened, for example, to a housing 27 not shown in this FIG. 1, in which case the protective element 22 is moved into the housing in the second movement phase (see FIGS. 1b and c) so that in the open position IIa according to FIG. 1c the protective element 22 is situated fully within the housing and not visible to the user.

Figures 2A, 2B, 2C:
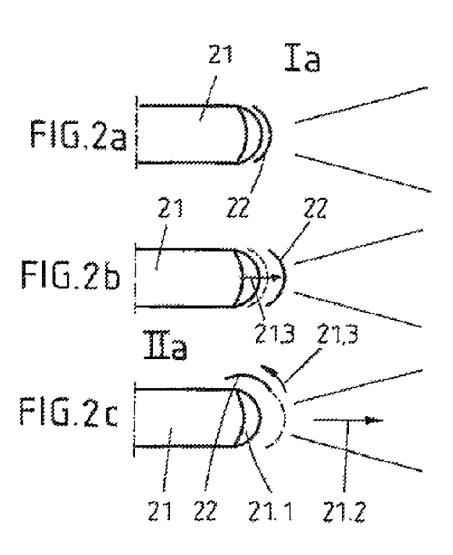
FIG. 2a shows a comparable view to FIG. 1a with an additional variant of the image acquisition system situated again in the closed position.
FIG. 2b shows the image acquisition system according to FIG. 2a, in which the protective element has separated from the camera unit.
FIG. 2c shows the image acquisition system according to FIG. 2a, in which the protective element is situated in the open position IIa.

Another variant of the first module 20 of the image acquisition system 10 according to the invention is shown in FIGS. 2a to 2c, in which the first movement phase is characterized by a purely translatory movement of the protective element 22 in the direction of the recording direction 21.2 (see FIG. 2b). Starting from the closed position Ia according to FIG. 2a a translatory movement of the protective element 22 occurs via a drive 41 (not shown) which is arranged in a second module 40, so that the distance from the protective element 22 to camera unit 21, especially lens 21.1, is increased. The protective element 22 is then moved away from the front area of the camera unit 21 via the second movement phase, which is shown in FIG. 2c.

Relative to the practical examples just described according to FIGS. 1 and 2, the second movement phase can also be a purely translatory movement. It is also conceivable that the second movement phase is accomplished by the fact that the protective element 22 moves in front of the camera unit 21 like a "sliding door" in order to provide the camera unit 21 with a sufficiently large view for image acquisition. For example, starting from FIG. 2b the protective element 22 can be moved in the direction of the plane of the drawing in the fashion of a sliding door perpendicular to the movement direction of the first movement phase.

The special advantage of this two-phase movement is seen in the fact that the camera unit 21, especially lens 21.1, is treated gently during the opening and closing process, since movement of a protective element 22 occurs essentially without contact with the camera unit 21. According to FIGS. 1 and 2 the protective element 22 can naturally lie directly on the camera unit 21 in its closed position. During the first movement phase according to FIG. 1 and FIG. 2, the protective element 22 is raised by a certain distance without causing scratches on lens 21.1 of the camera unit 21 before it is moved in the second movement phase in the direction of the open position IIa of the protective element 22. The protective element 22 according to the variant from FIG. 1 and FIG. 2 can be designed with a seal or cleaning element on its inside facing the camera unit 21, which lies directly on the camera unit 21, especially lens 21.2 in the closed position Ia of protective element 22. The mentioned seal protects the camera unit 21 from moisture, dirt, etc. in the closed position Ia.

If the protective element 22 is moved in a first movement phase parallel to the surface of lens 21.1, it is conceivable to provide the protective element 22 with a cleaning element so that the lens 21.1 is cleaned during the opening and closing process. In addition, a cleaning fluid, which is liquid or gaseous, can support the cleaning process. This cleaning fluid can be supplied by a tube right in front of lens 21.1, where it then emerges.

Figure 3:
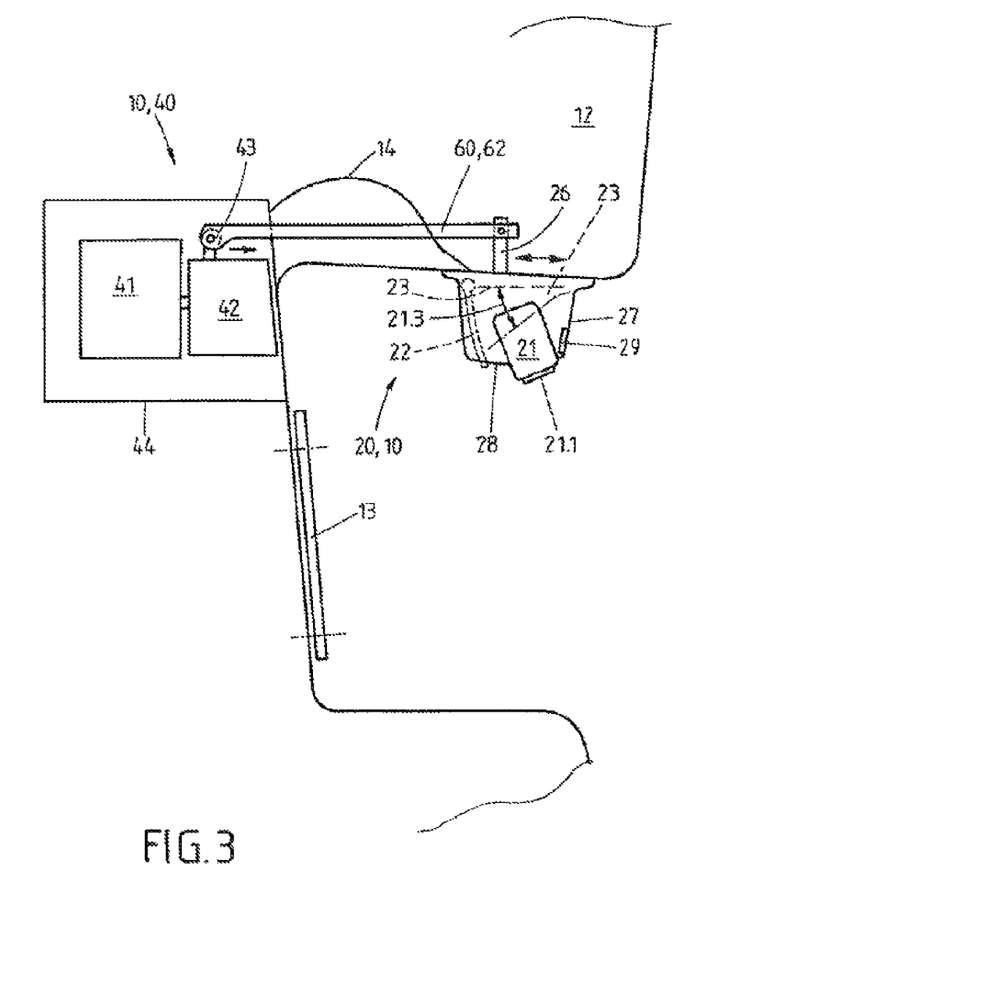
FIG. 3 shows a schematic view of the image acquisition system according to the invention, in which the first module is operated with the second module via a gear mechanism as an activation element.

A schematic sectional view of the entire image acquisition system is shown in FIG. 3. It is then apparent that this image acquisition system includes two modules 20, 40, namely a first module 20 and a second module 40, which are effectively connected to each other via activation element 60.

As is apparent from FIG. 3, the first module 20 is arranged in a recess for a license plate 13 in a trunk lid 12 in the vehicle. For better depiction the recess is shown very large in order to also be able to better depict the first module. Generally there is little room in this area of the trunk lid 12, since the license plate illumination and the trunk lid lock, as well as the operating element 25 for the trunk lid 12, are also provided. In order to nevertheless protect the camera unit 21, especially lens 21.1 of the image acquisition system 10 from external effects, like dirt, rainwater or the like, it is proposed to pass a protective element 22 in front of lens 21.1. A drive 41 is necessary for the movement of the protective element 22 required for this purpose, which requires corresponding space. This space is often not available in the area of the trunk lid 12. The image acquisition system 10 can also be provided in other areas of the vehicle where space was also sharply restricted. For this reason it is proposed to separate the drive unit for the protective element 22 by design from the camera unit 21. For this purpose the second module 40 is provided, which has the drive 41, which includes an electric motor. In addition, a gear mechanism 42 can be provided, which acts on an activation element 60 via a connection element 43. The entire second module 40 can be arranged in a housing 44 within the trunk lid 12, in which, however, it can have a significant spacing relative to the first module 20. Consequently, in terms of design one is not restricted to proximity of the first module 20 to the second module 40. Both the first module 20 and the second module 40 can be connected via fastening elements 11 to the trunk lid 12. These fastening elements 11 can comprise snap-in devices and their mating parts. Screws that cooperate with mating threads can also be involved. Clip connectors can also be involved, which cooperate with corresponding mating elements. A seal can additionally be provided between the first module and the trunk lid 12 so that no rainwater can penetrate into the interior of the trunk lid 12.

The first module 20 in FIG. 3 includes the camera 21, which is mounted to move in a mechanism 23. This mechanism 23 serves, on the one hand, for mounting of the protective element 22 and, on the other hand, for movable mounting of the camera unit 21, which can be moved in the movement direction 22 [sic]. The entire camera unit 21 in the closed position Ia is arranged in the housing 27 of the first module 20. The opening 28 of housing 27 is then covered by the protective element 22. The mechanism 23 ensures that the protective element 22 is initially transferred from the closed position Ia into the open position IIa. For this purpose the mechanism 23 is equipped with a connection element 26, which protrudes lever-like from the rear side of the first module 20. This connection element 26 is movable horizontally so that the mechanism 23 can be activated. It is also conceivable that the connection element 26 can be arranged to tilt or pivot in the first module 20 and cooperates with the mechanism 23. Activation of the connection element 26 of the first module 20 occurs via the activation element 60, which is also mechanically connected to the second module 40. In the present case the activation element 60 is configured as a push and pull rod 62. The activation element 60 is connected to the connection element 43 in the second module 40. This connection element 43 is also horizontally displaced by the gear mechanism 42. The gear mechanism 42 is itself driven by a drive 41. It is also conceivable that the drive 41 also acts directly on the activation element 60. Both the connection element 26 and the connection element 43 can be articulated to the rod-like activation element. After the protective flap 22 has been opened by mechanism 23 by means of activation element 60, the moving camera unit 21 is also moved from a rest position IIb into the recording position Ib in its movement direction 21.3. The closure process for the first module 20 occurs in reverse, in which the camera unit 21 is initially moved in the opposite movement direction 21.3 so that the protective element 22 can then change into the closed position Ia from its open position IIa.

Figure 4:
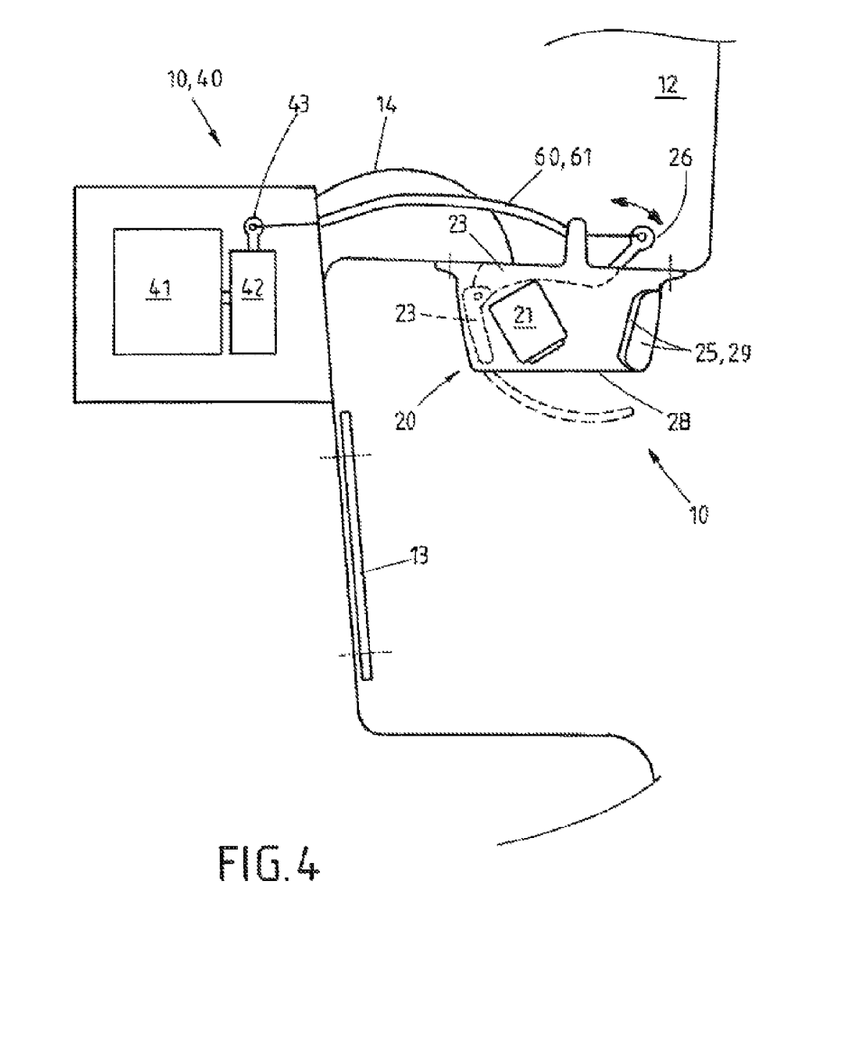
FIG. 4 shows a comparable view of another practical example to FIG. 3, in which, however, the first and second module are connected via a Bowden cable as an activation element and the first module additionally has an operating element

Another variant of the image acquisition system 10 according to the invention is shown in FIG. 4. Here the first module 20 includes not only the camera unit 21, but also an operating element 25 so that the trunk lid 12 can be opened. Both the camera unit 21 and the operating element 25 are protected in the closed position Ia from external environmental effects by the protective element 22. As also follows from FIG. 5, which shows a cross section through the first module from FIG. 4, the camera unit 21 and the operating element 25 are arranged next to each other. The image signal obtained by the camera unit 21 is sent from the first module 20 to the vehicle via an electrical connection. The image signal can be made visible to the driver there on a monitor in the interior of the vehicle.

The camera unit 21 is arranged fixed in FIG. 4, that is, unmovable in the first module 20. Consequently, the indicated mechanism 23 serves only the protective element 22. This mechanism 23 is activated via the lever-like connection element 26. The end of Bowden cable 61 engages on this lever-like connection element 26, which serves as activation element 60. With the other end the Bowden cable 61 leads into the second module 40 where the Bowden cable 61 is connected to connection element 43. The Bowden cable 61 can have an adjustment mechanism so that the length of the Bowden cable 61 is adjustable. An adjustment is also possible on this account. The spring element that serves for the restoring force of the protective element 22 and/or camera 21 is not shown in FIGS. 3 and 4. As mentioned previously in the description, several spring elements can also be used, which are used for automatic reset of the camera unit 21 and protective element 22.

Figure 5:
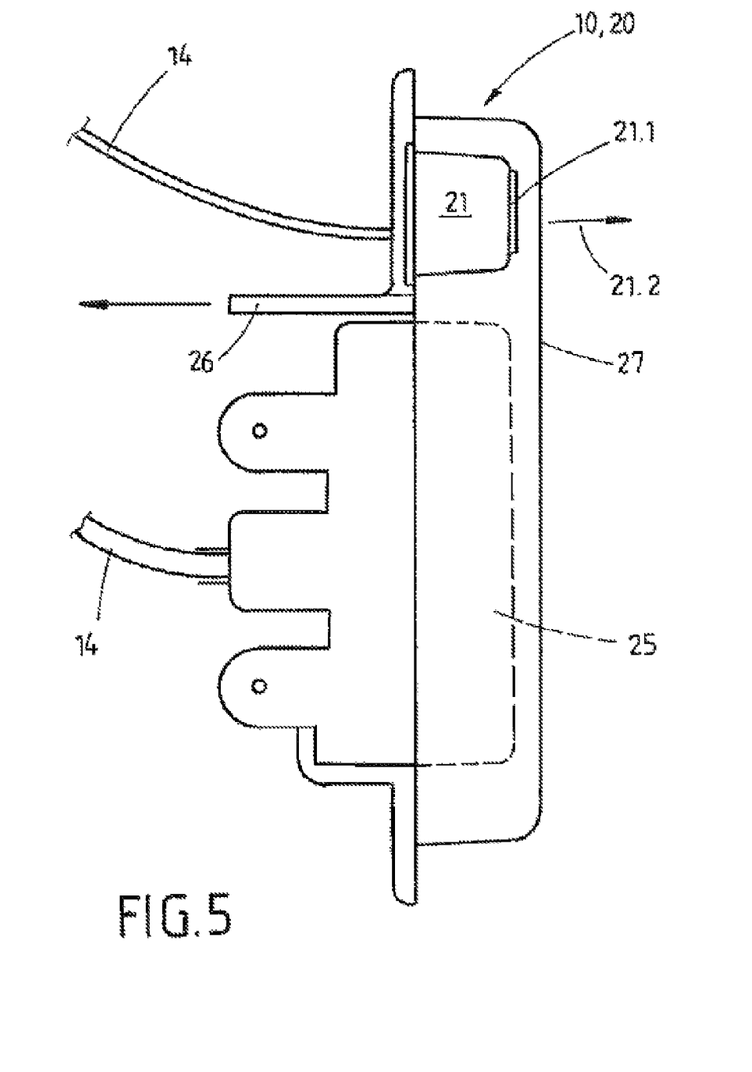
FIG. 5 shows a cross section through the first module from FIG. 4.

It is apparent from FIG. 5 that the camera unit 21 is arranged next to the operating element 25 within the first module 20. Electrical connections 14 lead to the vehicle both from the camera unit 21 and from the operating element 25. Activation of the protective element 22 occurs via the lever-like connection element 26, which can be activated leftward. A toggle lever mechanism can be arranged between this connection element 26 and mechanism 23 so that the protective element 22 with closed position Ia cannot be easily opened from the outside. The self-inhibiting effect of the toggle lever mechanism can only be overcome by a violent and destructive opening. In addition, a proximity sensor 29, as shown in FIG. 3, as well as additional sensors or electrical switch elements can be arranged on or in the first module 20. The proximity sensor 29 can be configured as a capacitive sensor.

The invention claimed is:

1. Image acquisition system with a camera unit used for image acquisition of the outside area of the vehicle and a protective element, which can be moved from a closed position to an open position via a mechanism by means of a drive, in which
    at least one lens of the camera unit is situated behind the protective element inaccessible from the outside in the closed position of protective element and
    at least the lens of camera unit is released by the protective element for image acquisition in the open position, wherein
    at least the camera unit with the mechanism and the protective element is arranged in a first module and the drive is provided in a second module separated from the first module, the first and second modules being mechanically connected to each other through at least one activation element so that the drive drives the mechanism via an activation element, wherein the protective element is transferred from the closed position into the open position by the mechanism by means of the activation element, and the mechanism having a connection element for activation of the mechanism,
    wherein the activation of the connection element occurs via the activation element.

2. Image acquisition system according to claim 1, wherein the camera unit is mounted to move in the first module, the activation element also serving for a position change of camera unit from a rest position to a recording position.

3. Image acquisition system according to claim 2, wherein camera unit is mounted to move in a first module, the first activation element activating the protective element and a second activation element, especially of the same construction, serving for a position change of the camera unit from a rest position to the recording position.

4. Image acquisition system according to claim 1, wherein mechanism for the protective element also serves for accommodating and mounting the removing camera unit.

5. Image acquisition system according to claim 1, wherein the activation element transfers the protective element from its closed position to its open position and a recording direction of the moving camera unit can be controlled by the activation element.

6. Image acquisition system according to claim 1, wherein the protective element and/or the moving camera unit are spring-loaded so that the protective element can be transferred from its open position to its closed position and the camera unit from its recording position to the rest position by the spring force.

7. Image acquisition system according to claim 1, wherein the mechanism for activation of the protective element has a toggle lever mechanism so that the protective element cannot be activated from the outside in the closed position.

8. Image acquisition system according to claim 1, wherein the activation element is a Bowden cable, a pushrod or rotating rod, a gear mechanism, a toothed belt or chain or the like.

9. Image acquisition system according to claim 1, wherein the protective element is configured in one part as a cover or flap or the protective element is configured in several parts, especially as a louver or central closure or shutter closure.

10. Image acquisition system according to claim 1, wherein the protective element is mounted in a slit-like guide in front of lens of the camera unit.

11. Image acquisition system according to claim 1, wherein the protective element changes from its open position to its closed position through the mechanism by means of a translatory and/or rotatory movement, in which the movement process can be divided into different phases that differ by the type of the movement.

12. Image acquisition system according to claim 1, wherein the second module is arranged at a distance from the first module, the distance being greater than 5 centimeters, preferably greater than 10 and 20 centimeters.

13. Image acquisition system according to claim 1, wherein an operating element and/or a mechanical lock cylinder is arranged next to camera unit, which are also accommodated protected from the outside with the protective element in the closed position.

14. Image acquisition system according to claim 1, wherein a proximity sensor is provided on or in the first module so that the approach of persons and/or objects is detectable.

15. Image acquisition system according to claim 1, wherein the activation element is configured to be a bendable component.

16. Image acquisition system according to claim 1, wherein the activation element is configured as a push and pull rod.

17. Image acquisition system according to claim 1, wherein the activation element is connected to both the connection element of the first module and a further connection element of the second module, wherein the connection element of the first module cooperates with the mechanism.

* * * * *